United States Patent
Kurian et al.

(10) Patent No.: US 12,489,615 B1
(45) Date of Patent: Dec. 2, 2025

(54) LEVERAGING QUANTUM ENTANGLEMENT FOR REPLICATING DATA IN MULTIPLE LOCATIONS AND TWIN TAGGING THE DATA

(71) Applicant: Bank of America Corporation, Charlotte, NC (US)

(72) Inventors: Manu Kurian, Dallas, TX (US); Anamika Singhal, Addison, TX (US)

(73) Assignee: Bank of America Corporation, Charlotte, NC (US)

( * ) Notice: Subject to any disclaimer, the term of this patent is extended or adjusted under 35 U.S.C. 154(b) by 70 days.

(21) Appl. No.: 18/743,220

(22) Filed: Jun. 14, 2024

(51) Int. Cl.
*H04L 9/08* (2006.01)
*G06N 10/70* (2022.01)

(52) U.S. Cl.
CPC .......... *H04L 9/0858* (2013.01); *G06N 10/70* (2022.01)

(58) Field of Classification Search
CPC ... H04L 9/0858; H04L 9/0852; H04L 9/0855; G06N 10/70
See application file for complete search history.

(56) References Cited

U.S. PATENT DOCUMENTS

| | | | | |
|---|---|---|---|---|
| 2015/0214984 A1* | 7/2015 | Ahn | ....................... | H03M 13/29 714/755 |
| 2016/0105439 A1* | 4/2016 | Hunt | ....................... | H04L 63/20 726/4 |
| 2018/0260245 A1* | 9/2018 | Smith | ................... | G06F 15/163 |
| 2020/0374211 A1* | 11/2020 | Griffin | ..................... | H04L 45/04 |
| 2020/0401927 A1* | 12/2020 | Nickerson | .............. | G06N 10/40 |
| 2021/0272003 A1* | 9/2021 | Rigetti | ............. | G06N 10/80 |
| 2023/0067766 A1* | 3/2023 | McCarty | ........... | H04L 63/0428 |
| 2024/0073010 A1* | 2/2024 | Ganguly | ............... | H04L 63/083 |
| 2025/0038967 A1* | 1/2025 | Lamas Linares | ..... | H04L 9/0852 |

FOREIGN PATENT DOCUMENTS

WO   WO-2025093379 A1 *   5/2025   ........... H04L 9/0852

OTHER PUBLICATIONS

S. K. Borah and S. Bitragunta, "An Intelligent Link Selection Mechanism for Hybrid Classical-Quantum Communication Systems," in IEEE Communications Letters, vol. 26, No. 2, pp. 301-305, Feb. 2022, doi: 10.1109/LCOMM.2021.3129792. (Year: 2022).*

(Continued)

*Primary Examiner* — Michael Simitoski
(74) *Attorney, Agent, or Firm* — Weiss & Arons LLP (57) ABSTRACT

The method may include secure data transfer to meet a compliance requirement by using quantum computing over a quantum network. A quantum computer may establish quantum entanglement between qubits, save a data set to a first set of qubits, and teleport correlated quantum states of the data set to a second set of qubits situated at a different location. Quantum error correction may lengthen the storage time of the data set on the first set of qubits before the quantum states of the first set of qubits expire due to decoherence. The quantum computer may tag the quantum states of the data set on each set of qubits to aid in identification of the locations of each set of qubits. Teleporting the data set between locations on a quantum network may lead to less energy expenditure and reduced network travel compared to transporting the data set over a binary network.

20 Claims, 5 Drawing Sheets

(56) References Cited

OTHER PUBLICATIONS

D'Aloia, Maria Caterina, and Christian Esposito. "A Tutorial on Reliable Quantum Networks." 2024 14th International Workshop on Resilient Networks Design and Modeling (RNDM). IEEE, 2024. (Year: 2024).*

Farahbakhsh, Ali, and Chen Feng. "Opportunistic routing in quantum networks." IEEE INFOCOM 2022—IEEE Conference on Computer Communications. IEEE, 2022. (Year: 2022).*

Huberman, Bernardo A., and Bob Lund. "A quantum router for the entangled web." Information Systems Frontiers 22.1 (2020): 37-43. (Year: 2020).*

Institute for Quantum Computing. "Encoding Classical Data into Quantum States", 2021. Retrieved from <https://www.quair.group/software/pq/tutorials/machine_learning/dataencoding_en>. (Year: 2021).*

Kozlowski, Wojciech, et al. "Rfc 9340: Architectural principles for a quantum internet." (2023). (Year: 2023).*

Schoch, Isidor. "How to embed data into a quantum state", Aug. 2022. Retrieved from <https://pennylane.ai/blog/2022/08/how-to-embed-data-into-a-quantum-state>. (Year: 2022).*

Wong, Hiu Yung. "Chapter 20 Quantum Teleportation II and Entanglement Swapping", 2022. (Year: 2022).*

N. Zaunders, Z. Wang, T. C. Ralph, R. Aguinaldo and R. Malaney, "Quantum-Amplified Simultaneous Quantum-Classical Communications," 2024 International Conference on Quantum Communications, Networking, and Computing (QCNC), Kanazawa, Japan, 2024, pp. 160-167. (Year: 2024).*

Jozsa et al., "On the Role of Entanglement in Quantum Computational Speed-Up," https://arxiv.org/abs/quant-ph/0201143, Mar. 8, 2002.

Chad Orzel, "How Do You Create Quantum Entanglement," https://www.forbes.com/sites/chadorzel/2017/02/28/how-do-you-create-quantum-entanglement/, Feb. 28, 2017.

Emilio Pelaez, "Teleportation—The Quantum Style," https://medium.com/quantum-untangled/teleportation-protocol-1cdaa86ca40f, Jan. 20, 2021.

"The Quantum Teleportation Algorithm," QuIC Seminar 2, https://www.ryanlarose.com/semester-i.html, Oct. 22, 2018.

\* cited by examiner

LEVERAGING QUANTUM ENTANGLEMENT FOR REPLICATING DATA IN MULTIPLE LOCATIONS AND TWIN TAGGING THE DATA

FIELD OF TECHNOLOGY

Aspects of the disclosure relate to the use of quantum computing to transfer and store data over a quantum network.

BACKGROUND

Distributing data to multiple locations may often be required. For example, organizations may need to back up their data in archives in locations remote from the location of the original data. Cloud service providers may store data in one location on the Internet and transfer the data to a user location on the Internet. Regulatory and governmental requirements may require storage of data in a location remote from an organization's data storage location.

Sometimes data storage requirements persist for the indefinite future. Other times data storage requirements may be timebound. For example, meeting archiving or reporting requirements may require data to be stored for a time. After that time, the data may be required or allowed to be erased.

Movement of data between locations may be essential to meet the aforementioned goals. However, movement of data may incur danger of interception by a malicious party.

It may be important to develop a solution that facilitates saving data in a location remote from where it currently resides.

It may be important to save data for longer fixed periods or for shorter fixed periods.

It may be important to populate data in a remote location in a way that minimizes the risk of interception by a malicious party.

SUMMARY

It may be an object of the invention to facilitate storage of data in a location remote from where it currently resides.

It may be a further object of the invention to save data for a fixed period such as for a longer fixed period or for a shorter fixed period.

It may be another object of the invention to populate data in a remote location in a way that minimizes the risk of interception by a malicious party.

Included may be a method for secure data transfer and storage, for example, to meet a compliance requirement using quantum computing over a quantum network.

The method may include using a quantum computer to establish quantum entanglement between one set of quantum bits ("qubits") and another set of qubits. The quantum computer may establish quantum entanglement by establishing coherence between the two sets of qubits.

The quantum computer may store a data set on one set of qubits. The data set may be stored as quantum states on the set of qubits. The qubits may be situated in a first location. The first location may be where the quantum computer is situated. The first location may be situated remotely from the quantum computer.

Concurrent to storage of the data set on one set of qubits, the quantum computer may run a quantum algorithm that uses quantum entanglement to teleport the data set as quantum states between the one set of qubits to the other set of qubits. The quantum states of the two sets of qubits may be correlated with one other. The two sets of qubits may be situated in a first location and a second location. The second location may be where the quantum computer is situated. The second location may be situated remotely from the quantum computer.

The quantum computer may apply quantum error correction ("QEC") to maintain quantum states of either of the sets of qubits for a predetermined time. The QEC may maintain the quantum states by maintaining the coherence of the sets of qubits with each other. The QEC may allow the quantum states of the either set of qubits to be lost through decoherence resulting at a predetermined time. The loss of coherence may result in expiration of quantum states of either of the sets of qubits.

The first location and second location are such that if the data set is transmitted from the first location to the second location over a binary network, the data set may pass through a router, a switch, or a firewall.

The first location and second location are such that the quantum states of the set of qubits storing the data set may be teleported from the first location to the second location over the quantum network without passing through a router, a switch, or a firewall.

The energy expended to transfer the data set over the quantum network as quantum states of one set of qubits in the first location to quantum states of another set of qubits in the second location is less than energy expended to transfer the data set the first location to the second location over a binary network using a binary computer.

The quantum computer may tag the data set stored on the sets of qubits with unique, similar, and/or matching tags. The tags may aid in identification of the location of the set of qubits.

The compliance requirement may be a regulatory requirement. The compliance requirement may be a governmental requirement.

The quantum computer may store a set of qubits at the first location to comply with a regulatory requirement. The quantum computer may store one set of qubits at the first location to comply with a governmental requirement.

The quantum computer may store a set of qubits at the first location for the predetermined time to comply with a regulatory requirement. The quantum computer may store one set of qubits at the first location for the predetermined time to comply with a governmental requirement.

The quantum computer may store a set of qubits at the second location to comply with a regulatory requirement. The quantum computer may store one set of qubits at the second location to comply with a governmental requirement.

The quantum computer may store a set of qubits at the second location for the predetermined time to comply with a regulatory requirement. The quantum computer may store one set of qubits at the second location for the predetermined time to comply with a governmental requirement.

BRIEF DESCRIPTION OF THE DRAWINGS

The objects and advantages of the invention will be apparent upon consideration of the following detailed description, taken in conjunction with the accompanying drawings, in which like reference characters refer to like parts throughout, and in which.

DETAILED DESCRIPTION

The apparatus and method may secure storage of data concurrently in two locations using a quantum computer.

The apparatus may include a system for secure data transfer and storage to meet a compliance requirement using quantum computing over a quantum network. The system may include a quantum computer, a data set, a first set of qubits, and a second set of qubits.

The quantum computer may include creating superconducting circuits and cools them so much that electrical current may behave like a quantum mechanical system. The quantum computer may include trapping ions in an electric field where different energy levels represent different qubit states.

Quantum computers may have the ability to do achieve a task that would be improbable or impossible for a binary computer to achieve. The point where a quantum computer can outperform the binary computer in this way may be referred to as quantum advantage.

A binary system may be built on bits. A bit may be a unit of information stored as a zero or a one. By contrast, quantum computing may be built on qubits. Qubits may also store zeros and ones. However, the qubit may also exist in a superposition state possessing a property that the qubit exists in all possible states, for example, zero, one, and states in between zero and one, simultaneously. The superposition state may exist until it is collapsed into one state when a measurement is made.

When a binary computer solves a problem with multiple variables, it may need to conduct a new calculation every time a variable changes. Each calculation may be a single path to a single result. Quantum computers, however, may explore many paths in parallel through their property of containing qubits in superposition.

Superposition may be a fundamental concept in quantum mechanics, describing a condition in which a quantum system can exist in multiple states or configurations simultaneously.

The system may include configuration of the quantum computer to establish quantum entanglement between a first set of qubits and a second set of qubits. Quantum entanglement may facilitate storage of the second data set on the second set of qubits concurrently with storage of the first data set on the first set of qubits.

Quantum entanglement may include pushing qubits into the same quantum state. This may include pushing the qubits to be correlated to each other, even if the qubits are not in "contact" with each other. Entangled qubits may interact with other qubits which may allow for many different calculations to be done simultaneously. This may be an advantage of quantum computers that may allow them to work faster than binary computers.

Quantum entanglement may be a quantum correlation. Quantum correlation may be a correlation between parts of a quantum system including two or more quantum states.

For bits on a binary computer, a correlation may include a first bit being either 0 or 1, and a second bit matching the first bit's value of either 0 or 1. The correlation may be temporal such that at the time when the first bit has a value of 0 or 1, the second bit has the same value for that time.

For qubits on a quantum computer, a correlation may include a correlation like bits on a binary computer. However, there may be more than one way to view or measure a qubit. Since there may be multiple, complementary ways to view a qubit, measuring and describing correlated qubits may have complexity that is not found in correlated bits. This complexity may provide qubits with an ability to increase processing power of a quantum computer that contains correlated qubits.

Quantum entanglement may include a group of qubits whose quantum states are correlated to each other such that the quantum state of each qubit in the group may not be described independently from the quantum states of another qubit in the group. The qubits in the group may be generated together, interact together, or share spatial proximity to each other. Quantum entanglement may be a feature of quantum mechanics that is not present in classical mechanics such as binary systems.

A quantum state may be a state of a system of quantum mechanics. A quantum state may include a mathematical entity that includes knowledge of a quantum system. The quantum system may use the knowledge of the quantum state to make predictions for the quantum system. The quantum state may describe a condition in which a physical system exists. The quantum state may include a wave function or a set of quantum numbers.

Quantum states may change by a separate set of rules than classical states. For example, classical waves may be stopped by a barrier that's too tall, but quantum waves may be able to penetrate the barrier completely or partially.

Measurements of physical properties of a particle such as photons, electrons, molecules, and top quarks may include its position, its spin, its polarization, and its momentum. Each of these measurements may characterize its quantum state. These particle types may be examples of qubits. Qubits may include a two-state quantum system. Qubits may include a two-state quantum system in superposition. Before the measurements are made, the particles may exist in a state of superposition. For example, the spin of the particle may be both "up" and "down" at the same time.

Quantum entanglement may exist between two or more particles such as qubits. A pair of entangled particles may be generated such that their total spin is zero. For example, if one particle has a spin of "up" then the other entangled particle may have a spin of "down." Quantum entanglement may give rise to a paradox. The paradox may include that the wave function of the qubit may collapse when the properties of the qubit are measured.

Entanglement may produce correlation between the measurements. The mutual information that may emerge from correlation of entangled particles may be utilized. One such utilization of quantum entanglement may include the creation of quantum computers which include entangled particles.

Quantum entanglement may be established in different ways. Some examples of establishing quantum entanglement may include entangling the particles from the time they are created. For example, photons may be entangled using a cascade transition. Cascade transition may include putting calcium atoms into a highly excited energy level where their electrons decay by emitting two photons, passing through an intermediate state with a short lifetime.

Another way to establish quantum entanglement may include taking entangled photons and directing them to a pair of atoms that can absorb the entangled photons. The atoms may then possess a similar correlation as the photons. The atoms may be easier to maintain for a longer time than the photons. A longer time may mean a greater amount of time.

A further way to establish quantum entanglement may include taking atoms at different locations that emit photons. The photons may be brought together in a way that leads to entanglement of the photons. This may then lead to entanglement of the original atoms.

Another way to establish quantum entanglement may include a Rydberg blockade scheme. This scheme may include exciting one of two atoms that are relatively close in proximity. When that atom is excited and proceeds to a Rydberg state, that atom may excite the second atom. If successful, the two atoms may be anti-correlated with each other, and thereby entangled.

Quantum systems may change their state when the system is observed or measured. As a result, the original state of the quantum system may not be copied directly since copying may require measuring the state of the quantum system being copied. Not being able to copy a quantum system directly may include not being able to clone to quantum system.

In place of cloning data stored in a quantum system, other methods may be utilized to transfer data in a quantum network. A quantum network may use qubits to transfer and share data between quantum computers. Quantum computers may include quantum processors. Quantum computers may utilize quantum entanglement. Through entanglement, adding extra qubits to a quantum computer may increase the latter's computational power exponentially. Quantum entanglement may be used to store the data set on the second set of qubits concurrently with storage of the data set on the first set of qubits. A direct connection between qubits may be established by sending an entangled photon beam in free space to connect endpoints in a quantum system without the need for a physical medium.

A quantum network may have end nodes on which applications are ultimately run. End nodes may include quantum computers that may include quantum processors containing one or more qubits. Quantum computers in the quantum network may communicate over communication lines. Communication lines may include, for example, optical fibers.

Quantum computers may communicate using photons to transmit qubits between remote places. An advantage of photons may include that they are well isolated from perturbations. Isolation from perturbations may translate into long-lived superposition states for qubits that are photons. Another advantage of photons is that they may propagate along an optical fiber with low attenuation.

Second, to transport qubits from one node to another, the quantum network may use communication lines. Communication lines may include telecom fibers such as fiber optics cables. Electromagnetic waves may also be used to transport qubits. Quantum computers may establish quantum entanglement allowing data to be teleported between the quantum computers in the quantum network.

Third, optical switches may be capable of delivering qubits to the intended quantum processor. The optical switches may be needed to preserve quantum coherence.

Fourth, quantum repeaters may be utilized to transport qubits over long distances. Repeaters may appear between end nodes. Quantum entanglement may establish coherence between qubits at the end nodes. Entangled qubits may transfer the quantum states of the qubits. The qubits may be in proximity or work over a distance.

Another method may include establishing an indirect connection using optical fibers to connect end nodes in a quantum system. The entangled photons may travel through the fibers while maintaining their entangled state.

Long distance movement of data using a quantum system may utilize quantum repeaters. Quantum repeaters may move quantum information along multiple, shorter stops along a communication chain.

The quantum computer may be configured to store a data set on one set of qubits. The data set may be stored as quantum states on the set of qubits. The qubits may be situated in a first location. The first location may be where the quantum computer is situated. The first location may be situated remotely from the quantum computer.

Storage of the data set on qubits may include storing data in a quantum memory. Quantum memory may be stored on a quantum memory device. A quantum memory device may store the data as the quantum states of photons. A quantum memory device may store the data as qubits, such as a set of qubits. Qubits may include the quantum state of photons. The data may later be retrieved in the same quantum states.

The quantum state may be maintained for an amount of time in a coherent state. Coherent matter systems may be necessary for quantum memories; otherwise, the medium's ability to store quantum information may be compromised by decoherence. The coherent state may allow for the entanglement between elements of the quantum memory device or between the quantum memory device and elements outside of the device. Elements may include the quantum states of photons or qubits. The quantum state of the photons may be maintained for an amount of time specified by a user without losing the stored data by the system becoming decoherent.

Quantum entanglement dispersion over vast distances and through several quantum memories may be crucial for the development of a quantum computing network.

The quantum computer may be used to control where the data set is stored. The data set may be stored on a set of qubits. The set of qubits may be situated in a first location. The first location may be situated in proximity to the quantum computer. The first location may be situated remotely from the quantum computer.

Concurrent to storage of the data set on one set of qubits, the quantum computer be configured to run a quantum algorithm that uses quantum entanglement to teleport the data set as quantum states between the one set of qubits to the other set of qubits. The quantum states of the two sets of qubits may be correlated with each other. The two sets of qubits may be situated in the first location and a second location. The second location may be situated in proximity to the quantum computer. The second location may be situated remotely from the quantum computer.

The algorithm may include a quantum teleportation protocol. Teleportation of the data set may use quantum entanglement. Quantum teleportation may include the power to disappear from one location and appear at another, without traveling in between by use of wires or electromagnetic waves.

One application of teleportation may include having two chips in a quantum computer. To send quantum Information from one to the other, quantum entanglement may be established between the two chips. Teleportation may then be used to send information from one to the other. Teleportation may be essential for scaling up quantum computing to large systems able to solve complex problems.

The quantum computer may tag the data set stored on the sets of qubits with unique, similar, or matching tags. The tags may aid in identification of the location of a set of qubits. A data tag may be a non-hierarchical keyword or term assigned to a piece of information which helps describe an item and allows it to be found or processed automatically.

The quantum computer may apply quantum error correction ("QEC") to modulate the quantum states of either of the sets of qubits for a predetermined time. Modulating the quantum states may include controlling the length of time that coherence is maintained, and then allowing for decoherence.

A qubit may need some degree of loose interaction with its environment to obtain data from the qubit. However, too much interaction with its environment may cause disturbance and collapse superposition. Decoherence may come about when a qubit interacts with its environment.

Decoherence may include an absence of coherence. Decoherence may lead to errors in quantum information.

The QEC may maintain the quantum states by maintaining the coherence of the sets of qubits with each other. The QEC may allow the quantum states of the either set of qubits to be lost through decoherence at a desired time such as a predetermined time. The aforementioned loss of coherence may result in expiration of quantum states of either of the sets of qubits.

A user of the quantum computer may set the predetermined time. Compliance requirements may set a predetermined time.

The first location and second location are such that if the data set is transmitted from the first location to the second location over a binary network, the data set may pass through a router, a switch, or a firewall.

A binary network may be a network that only includes one and zero, where a one indicates that there is a connection and a zero indicates that there is no connection. Allowing additional values may create a weighted network.

The first location and second location are such that the quantum states of the set of qubits storing the data set may be teleported from the first location to the second location over the quantum network without passing through a router, a switch, or a firewall.

The quantum computer may apply QEC to maintain quantum states of either of the sets of qubits for a predetermined time. The QEC may maintain the quantum states by maintaining the coherence of the sets of qubits with each other. The QEC may allow the quantum states of the either set of qubits to be lost through decoherence resulting at a predetermined time. The loss of coherence may result in expiration of quantum states of either of the sets of qubits.

Decoherence may lead to expiration of the data set. Quantum states are fragile as it is hard to stop a qubit from interacting with its environment. Factors such as electromagnetic fluctuations, temperature changes, and quantum measurements may disrupt the quantum state. Any noise in the system may lead to decoherence. Decoherence may include breakdown of a superposition that causes a loss of data such as a loss of the set qubits. Quantum decoherence may be a loss of quantum coherence.

However, some small amount of error and fluctuation may be tolerable. Fluctuation may be normal in quantum computing since it works with probabilities. Binary computing, on the other hand, may work with strict rules. However, once the fluctuations in the quantum system become significant, the qubits in the system may go into a state of decoherence. Once in the state of decoherence, the data being held by the quantum state on the qubit may be lost. In the state of decoherence, the qubit may lose coherence with another qubit with which it was entangled. A common error that may lead to decoherence includes bit flips where a qubit suddenly switches to a wrong state.

Decoherence may include interactions a qubit has with its environment which causes disturbances and collapse superposition. Decoherence may lead to errors in quantum information. However, there may need to be a loose interaction of a qubit with its environment to read data held by the qubit.

Quantum systems may be fragile. Their ability to store information and operate in a way that may be exponentially greater than traditional binary computers may be related to their ability to establish and maintain coherence. Coherence may refer to synchronization and correlated behavior of the quantum system. The phenomenon of decoherence may jeopardize quantum computers from distinguishing their performance from binary computers. Decoherence may be a process in which the information stored in qubits quickly loses its quantum properties because of the interactions of the qubits with the surrounding environment.

Quantum decoherence may include the loss of quantum coherence. Understanding how quantum systems perform upon quantum decoherence may provide insight to understand how quantum systems convert to binary systems such as a binary system that may be explained by classical mechanics. Quantum computing may rely on quantum coherence. Coherence may enable quantum entanglement. Quantum computing may utilize quantum entanglement. Quantum computing may be a primary practical applications of the coherence.

In quantum mechanics, particles such as electrons may be described by a wave function. A wave function may be a mathematical representation of the quantum state of a system. A probabilistic interpretation of the wave function may be used to explain various quantum effects. When there exists a definite phase relation between different states, the system may be said to be coherent. A definite phase relationship may be necessary to perform quantum computing on quantum information encoded in quantum states. Coherence may be preserved under the laws of quantum physics.

If a quantum system was perfectly isolated, the quantum state may be maintained. With the quantum state maintained, the system may remain coherent indefinitely. However, it may be impossible to manipulate or investigate the quantum system. If the quantum system is not perfectly isolated, for example during a measurement, coherence may be shared with the environment and may appear to be lost with time. This process may be called quantum decoherence or environmental decoherence.

As a result of the quantum system not being perfectly isolated, quantum behavior may seem to be lost. If the quantum state degrades, the quantum system may lose coherence. Decoherence may be viewed as the loss of information from the quantum system into the environment.

QEC may offer a means to combat this decoherence as well as other quantum noise. QEC may employ redundancy to protect the qubit of information by encoding it in a system larger than what, in principle, is needed to represent a single qubit. QEC may achieve fault tolerant quantum computing that may reduce the effects of noise on stored quantum information, faulty quantum gates, faulty quantum preparation, and faulty measurements. QEC may allow quantum computing algorithms of greater circuit depth.

However, employing many redundant qubits may make the effect of the surrounding environment more invasive and the encoded qubit more fragile. QEC may strike a balance between employing redundant qubits to correct for error and maintaining coherence.

QEC may work by building a quantum computer with a few logical qubits that do the math and a bunch of standard qubits to correct for errors. You may need upwards of a hundred standard qubits to correct for errors in a single logical qubits. The result would be an extremely reliable and generally useful computer. ii) See through the noise created by different errors. Build noisy intermediate-scale quantum computers using a set of algorithms. This may be good in some circumstances but not across the board. iii) Use a different source of qubits that are less susceptible to noise and better at retaining information.

QEC may employ redundancy. For example, a repetition code may be employed. When storing information multiple times, the copies may be found to disagree. An approach to handling this scenario may be to take a majority vote. This approach may assume that the error, such as a quantum noise error, which was introduced into the system less than the correct values. The version of the data that is the majority may be assumed to be the correct version of the data. While it may be possible that the majority version of the data is in error, this outcome may be less likely than the minority version being erroneous. Additionally, accepting either version as the correct version may reduce the effect of the noise.

The quantum computer may apply quantum error correction ("QEC") to maintain quantum states of either of the sets of qubits for a predetermined time. The QEC may maintain the quantum states by maintaining the coherence of the sets of qubits with each other. The QEC may allow the quantum states of the either set of qubits to be lost through decoherence resulting at a predetermined time. The loss of coherence may result in expiration of quantum states of either of the sets of qubits.

The energy expended to transfer the data set over the quantum network as quantum states of one set of qubits in the first location to quantum states of another set of qubits in the second location is less than energy expended to transfer the data set the first location to the second location over a binary network using a binary computer. Energy may include electric energy. Energy may include processing energy. Transferring data over a binary network may require the use of energy.

The first location and second location are such that if the data set is transmitted from the first location to the second location over a binary network, the data set may pass through a router, a switch, or a firewall.

The first location and second location are such that the quantum states of the set of qubits storing the data set may be teleported from the first location to the second location over the quantum network without passing through a router, a switch, or a firewall.

A binary computing network may include a classic network. Two of the main concepts that are fundamental to binary computing networks may be packets and protocols.

In binary networks, a packet may be a small segment of a larger message. Each packet may contain both data and information about that data. The information about the packet's contents may be metadata and may be referred to as a header. The header may appear ahead of the data.

When data gets sent over the Internet, it may be broken up into smaller packets. The packets may get routed to their destination by various networking devices such as routers and switches.

A router may be a device that connects two or more packet-switched networks or subnetworks. It may serve two primary functions: managing traffic between these networks by forwarding data packets to their intended Internet Protocol ("IP") addresses and allowing multiple devices to use the same Internet connection. A router may send data to networks of multiple devices. A router may be a network router. A router may include traffic routers.

A switch may connect devices within a network, such as a local area network ("LAN" or "LAN*"), and forward data packets to and from those devices. A switch may send data to a single device it is intended for, which may be another switch, a router, or a user's computer. A switch may be a network switch.

Packets are sent across the Internet and may use a technique called packet switching. Intermediary routers and switches may process the packets independently from each other, without accounting for their source or destination. This is by design so that no single connection dominates the network, and an almost unlimited number of people may use the Internet simultaneously.

On their way to their destination, the packets may pass through a firewall. A firewall may sit between a network and the Internet, controlling the flow of data both in and out of the network in order to stop potential security threats. A firewall may include a packet-filtering firewall. The packet-filtering firewall may create a checkpoint at a router or switch, perform a check of the packets coming through the router or switch, and inspect information such as the destination and origination IP address, packet type, port number, and other surface-level information.

The firewall may perform its job without opening the packet to inspect the contents further. The firewall may perform its job by opening the packet to inspect the contents further. The firewall may provide a divide between the Internet and an enterprise. The firewall may analyze the contents of each packet to ensure its safety. Packets that do not meet a set of established criteria may end their path and may cease to exist.

When the packets arrive at their destination, a receiving device may reassemble the packets in order and may then use or display the data they contained.

Standardized protocols may be used to connect computers in a network. Even computers running different hardware and software may be connected using standardized protocols. One protocol includes IP for sending packets from network to network. Another protocol includes Transmission Control Protocol ("TCP") for ensuring those packets successfully arrive in order.

A packet analyzer may differ from a firewall in that the packet analyzer may be a utility that may view packets in transit without modifying the packets. The packet analyzer may watch, display, and log the traffic of packets in a network or between an enterprise and a network. A firewall, in contrast, may view packets in transit and block or drop any packets that its programming dictates. A firewall may be placed between an enterprise and a network.

Both may be used by the enterprise as part of its security. However, either may also be used by a malicious party to harm the enterprise. In the case of the packet analyzer, a malicious party may place a packet analyzer outside of the enterprise's firewall to monitor network traffic. The packet analyzer may capture packets and write them, for example, to a local hard drive for analysis at the malicious party's convenience.

The packet analyzer may be a piece of hardware or software also known as a protocol analyzer, a network analyzer, or a packet sniffer. The packet analyzer may look at packets sent through wired and wireless networks.

Quantum entanglement may provide a solution to the issue of a malicious party. By creating quantum entanglement between two enterprises, such as by entangling qubits, data may be sent from one enterprise to another through quantum teleportation.

Quantum entanglement may describe a phenomenon of a group of particles being generated, interacting, or sharing spatial proximity in such a way that the quantum state of each particle of the group may be dependent on the state of the others, including when the particles are separated by a large distance. Particles may include qubits. Particles may be photons.

Entangled qubits may be correlated such that they cannot be described independently from each other. An operation that happens to the state or basic quantum characteristics of one qubit in an entangled pair may affect the state of the other qubit. The operation of the first qubit may require an immediate and predictable change to the entangled qubit, regardless of the distance between them. This phenomenon may allow for knowing the resulting state of one qubit by measuring the state of the other qubit.

Measurements of physical properties such as position, momentum, spin, and polarization performed on entangled particles may be correlated. If a pair of entangled particles such as photons or qubits is generated such that their total spin is known to be zero, and one particle is measured and found to have clockwise spin on a first axis, then the spin of the other particle, measured on the same axis, may be found to be anticlockwise. Maintaining a total spin momentum of zero may be referred to as the conservation principle.

For entangled qubits, the first qubit still may have an approximately 50% chance of being a zero or a one after measurement. However, for the entangled pair, the measurement results for the second qubit may be the same as the measurement of the first qubit. The entanglement of the two qubits may ensure that whatever happens to one of them, happens to the other.

A phenomenon found with quantum particles such as qubits or photons may include where measuring a particle's properties results in an apparent and irreversible wave function collapse of that particle and changes the original quantum state. With entangled particles, such measurements may affect the entangled system.

Entangled qubits may transmit data. If a qubit at one end of a quantum network changes its quantum state, such as when it is storing a new piece of data, the entangled qubit at another location in the network such as at another end of the network may instantly reflect the correlated change. Bits of data may be communicated by observing changes in quantum state.

The energy expended to transfer the data set over the quantum network as quantum states of one set of qubits in the first location to quantum states of another set of qubits in the second location is less than energy expended to transfer the data set the first location to the second location over a binary network using a binary computer.

The quantum computer may tag the data set stored on the sets of qubits with unique, similar, or matching tags. The tags may aid in identification of the location of the set of qubits.

The compliance requirement may be regulatory requirement. The compliance requirement may be a governmental requirement. Storing of data may be to The quantum computer may store a set of qubits at the first location to comply with a regulatory requirement. The quantum computer may store one set of qubits at the first location to comply with a governmental requirement.

The quantum computer may store a set of qubits at the first location for the predetermined time to comply with a regulatory requirement. The quantum computer may store one set of qubits at the first location for the predetermined time to comply with a governmental requirement.

The quantum computer may store a set of qubits at the second location to comply with a regulatory requirement. The quantum computer may store one set of qubits at the second location to comply with a governmental requirement.

The quantum computer may store a set of qubits at the second location for the predetermined time to comply with a regulatory requirement. The quantum computer may store one set of qubits at the second location for the predetermined time to comply with a governmental requirement.

An organization's data retention policy may control how it saves data for compliance or regulatory reasons, as well as how it disposes of data once it is no longer required. A data retention policy may clarify how records and data should be formatted, how long they must be kept, and what storage system or devices are used to retain them. These factors may be based on the rules of whatever regulatory body that governs the industry.

Data retention policies may concern what data should be stored or archived, where that should happen, and for exactly how long. Once the retention time for a particular data set expires, it may be deleted or moved as historical data to secondary or tertiary storage, depending on the requirements. This way, primary storage may stay cleaner, and the organization remains compliant.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional, and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
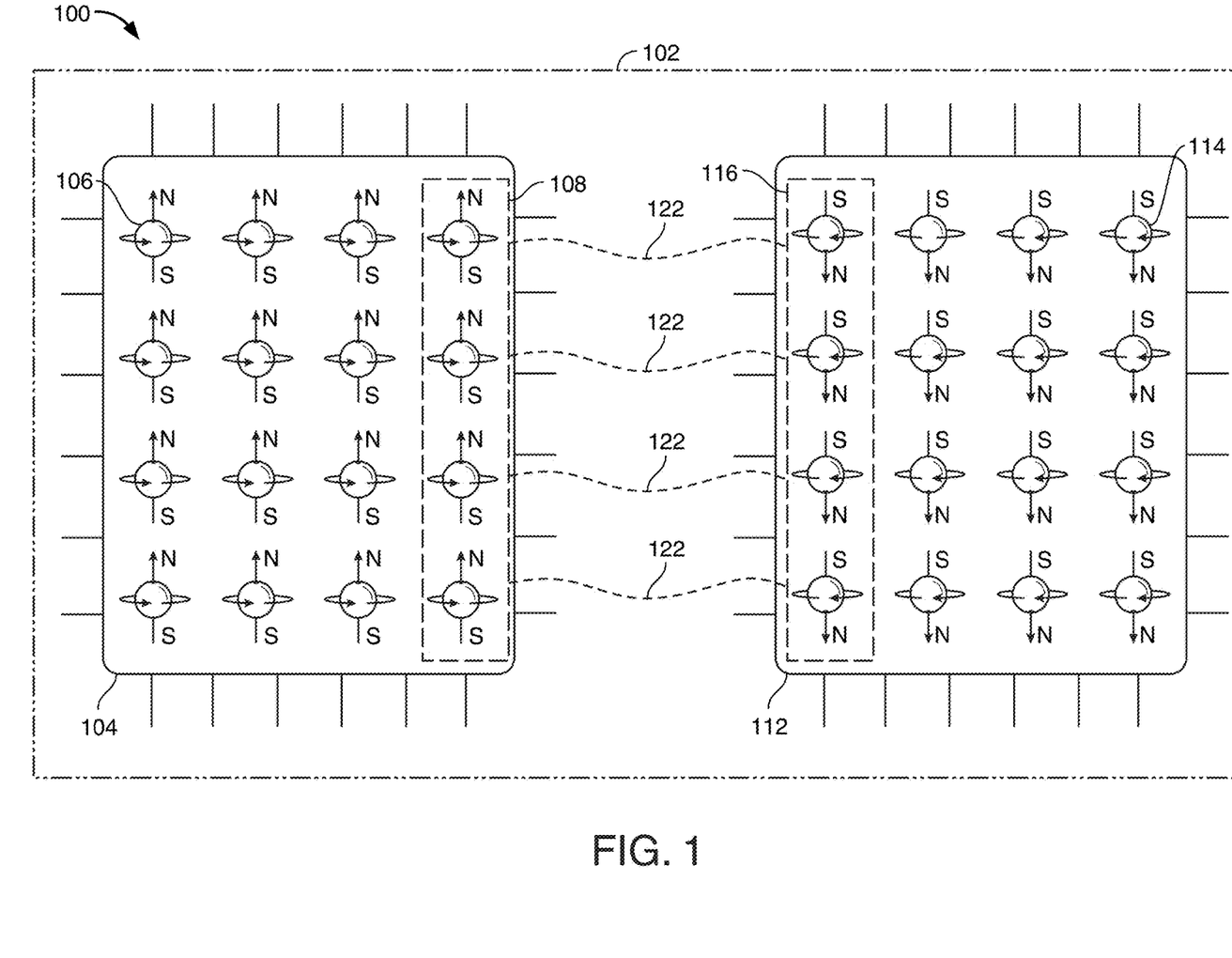
FIG. 1 shows an illustrative block diagram in accordance with principles of the disclosure.

FIG. 1 shows illustrative block diagram 100. Illustrative block diagram 100 may show an apparatus that includes a system for secure data transfer and storage to meet a compliance requirement using quantum computing over a quantum network.

The system may include quantum network 102. Quantum network 102 may include quantum computer 104. Quantum computer 104 may include a set of qubits, such as qubit 106, at the first location. The set of qubits may include entangled qubits 108.

Quantum network 102 may include quantum computer 112. Quantum computer 112 may include a set of qubits, such as qubit 114, at a second location. The set of qubits may include entangled qubits 114.

Entangled qubits 108 may be quantum entangled with entangled qubits 116. Quantum entanglement 122 may exist between entangled qubits 108 and entangled qubits 116.

At step 1, quantum entanglement 122 may be established over quantum network 102. Quantum computer 104 may establish quantum entanglement 122 with quantum computer 112. Quantum computer 104 may establish quantum entanglement 122 between qubits 108 and qubits 116. Quantum computer 104 may establish coherence between qubits 108 and qubits 116.

At step 2, quantum computer 104 may store a data set as quantum states. Quantum states may be represented by qubits 108. Qubits 108 may be in the first location.

At step 3, concurrent to storage of the data set on qubits 108, quantum computer 104 may run a quantum algorithm that uses quantum entanglement 122 between qubits 108 and qubits 116 to teleport the data set as quantum states from qubits 108 to qubits 116. The data that is stored on qubits 116 may be correlated to the quantum states of the data set saved on qubits 108. This correlation may be visualized in the figure by the spin on qubits 108 that may be in the upward direction and opposite to spin on qubits 116 that may be in the downward direction. The sum of the correlated spins of the entangled qubits may be zero.

At step 4, quantum computer 112 may apply QEC to maintain the quantum states of the data that is stored on qubits 116. QEC may enable the quantum states of the data to be stored on qubits 116 for a predetermined time before the QEC allows the quantum states of qubits 116 to be lost through decoherence. When the quantum states are lost through decoherence, the data stored on qubits 116 may expire. QEC may keep the data stored as quantum states on qubits 116 for the predetermined time to meet the compliance requirement.

The first location and second location may be such that if the data set is transmitted from the first location to the second location over a binary network, the data set would pass through a router, a switch, or a firewall. The first location and second location may be such that the quantum states of the qubits storing the data set are teleported from the first location to the second location over the quantum network without passing through a router, a switch, or a firewall.

The energy expended to use quantum computer 104 to transfer data as quantum states over quantum network 102 may be less than energy expended to transfer the data from the first location to the second location over a binary network using a binary computer. Quantum computer 104 may use quantum entanglement 122 to transfer the quantum states.

Quantum computer 112 applying QEC may keep the quantum states qubits 116 for a longer time than if QEC was not applied.

Quantum computer 104 may be configured to tag quantum states of qubits 108 with a first tag and quantum states of qubits 116 with a second tag. The first tag may be used to identify the first location. The first tag may be stored on quantum computer 104. The second tag may be used to identify the second location. The second tag may be stored on quantum computer 112.

The compliance requirement may be a regulatory requirement. The compliance requirement may be a governmental requirement.

Storing the quantum states of the data on qubits 116 for the predetermined time may meet a compliance requirement such as a regulatory requirement or a governmental requirement.

Figure 2:
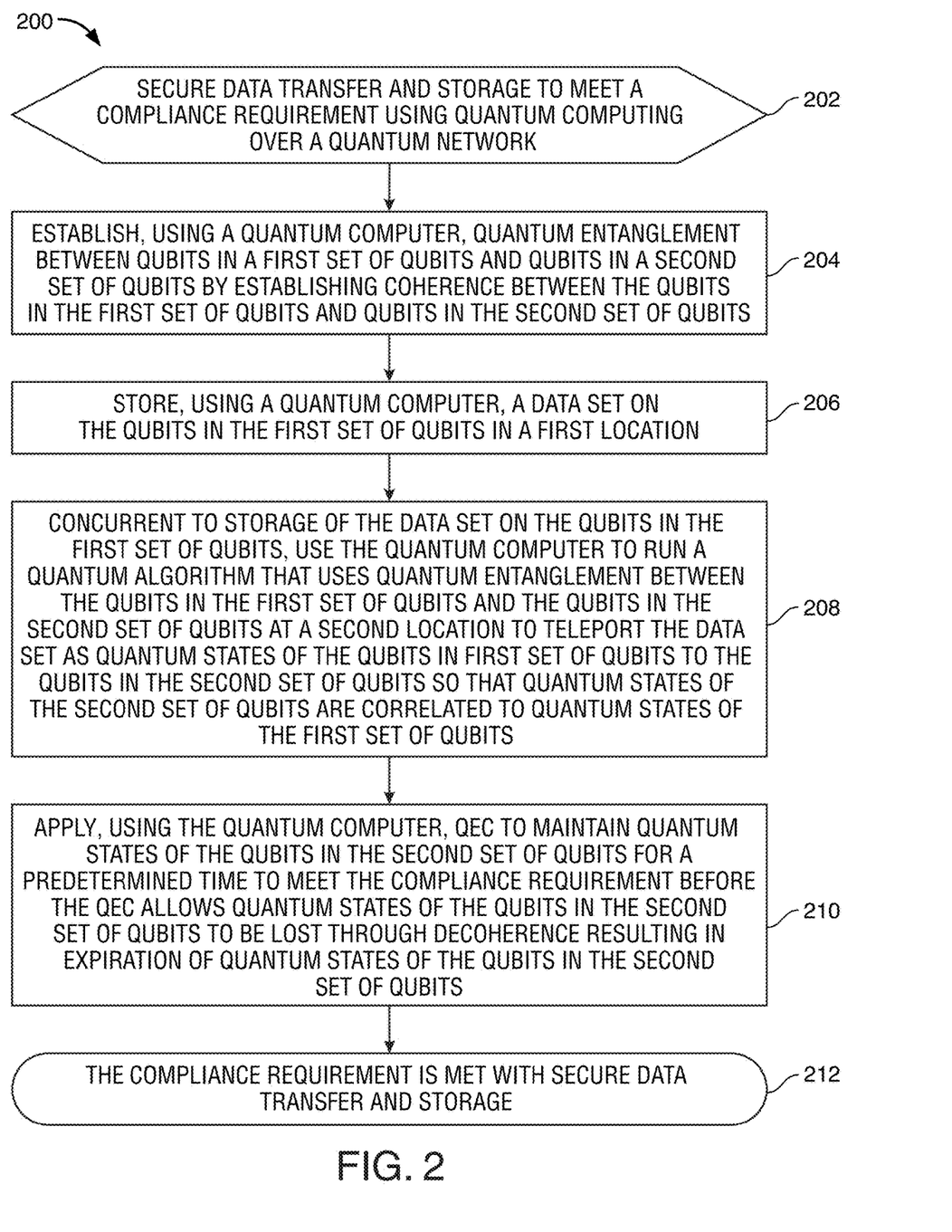
FIG. 2 shows an illustrative flowchart in accordance with principles of the disclosure.

FIG. 2 shows illustrative flowchart 200, beginning at step 202, that may provide a process for secure data transfer and storage to meet a compliance requirement using quantum computing over a quantum network.

At step 204, establish, using a quantum computer, quantum entanglement between qubits in a first set of qubits and qubits in a second set of qubits by establishing coherence between the qubits in the first set of qubits and qubits in the second set of qubits.

At step 206, store, using a quantum computer, a data set on the qubits in the first set of qubits in a first location.

At step 208, concurrent to storage of the data set on the qubits in the first set of qubits, use the quantum computer to run a quantum algorithm that uses quantum entanglement between the qubits in the first set of qubits and the qubits in the second set of qubits at a second location to teleport the data set as quantum states of the qubits in first set of qubits to the qubits in the second set of qubits so that quantum states of the second set of qubits are correlated to quantum states of the first set of qubits.

At step 210, apply, using the quantum computer, QEC to maintain quantum states of the qubits in the second set of qubits for a predetermined time to meet the compliance requirement before the QEC allows quantum states of the qubits in the second set of qubits to be lost through decoherence resulting in expiration of quantum states of the qubits in the second set of qubits.

The first location and second location may be such that if the data set is transmitted from the first location to the second location over a binary network, the data set would pass through a router, a switch, or a firewall. The first location and second location may be such that the quantum states of the qubits storing the data set are teleported from the first location to the second location over the quantum network without passing through a router, a switch, or a firewall.

The energy expended to use the quantum computer to transfer data as quantum states over the quantum network may be less than energy expended to transfer the data from the first location to the second location over a binary network using a binary computer. The quantum computer may use quantum entanglement to transfer the quantum states.

The quantum computer may apply QEC to keep the quantum states in the qubits of the second set of qubits for a longer time than if QEC was not applied.

The quantum computer may be configured to tag quantum states of the qubits in the first set of qubits with a first tag and quantum states of qubits in the second set of qubits with a second tag. The first tag may be used to identify the first location. The first tag may be stored on qubits in the first set of qubits. The second tag may be used to identify the second location. The second tag may be stored on qubits in the second set of qubits.

The compliance requirement may be a regulatory requirement. The compliance requirement may be a governmental requirement.

Storing the quantum states of the data on qubits in the second set of qubits for the predetermined time may meet a compliance requirement such as a regulatory requirement or a governmental requirement.

Figure 3:
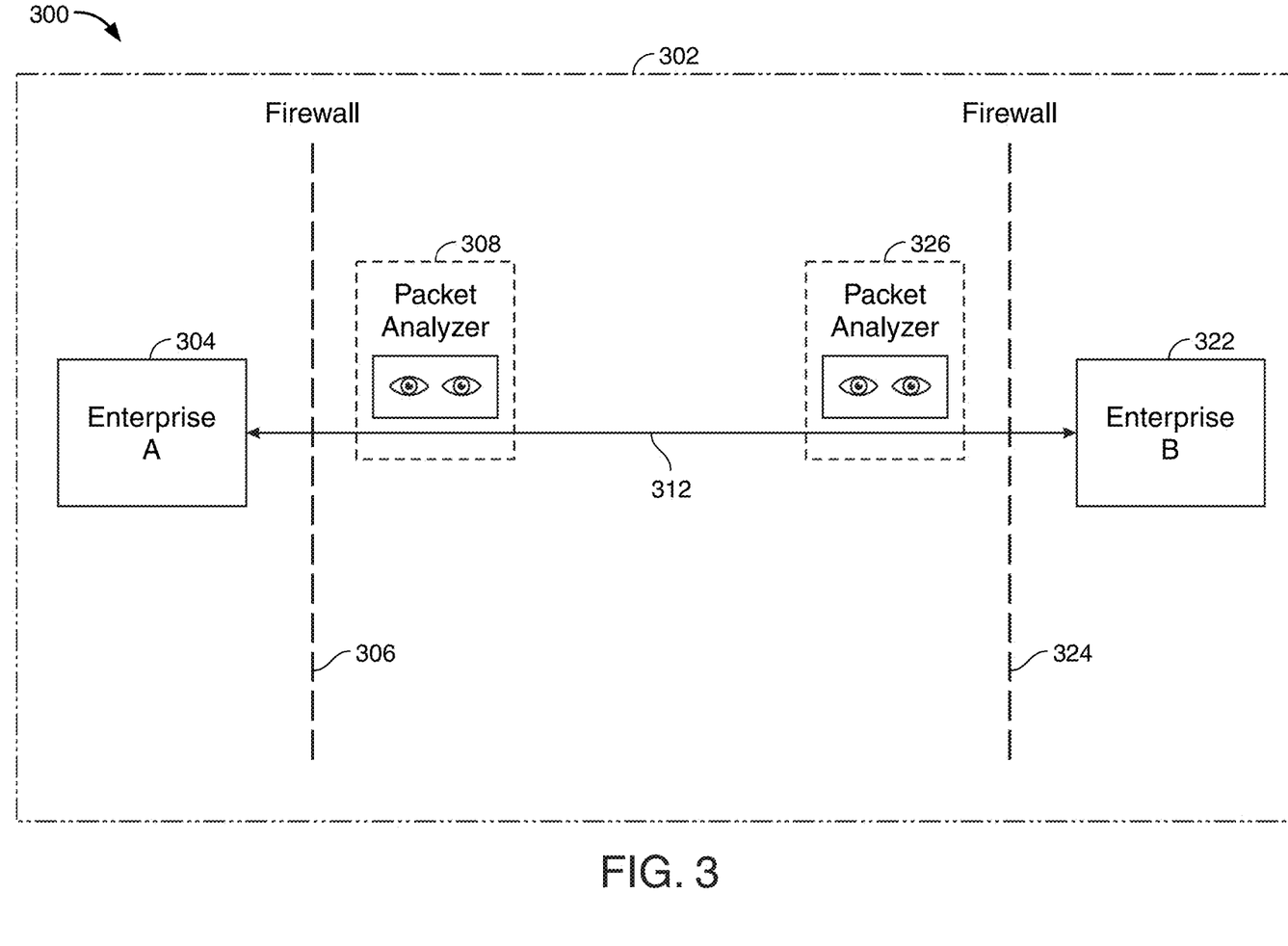
FIG. 3 shows an illustrative block diagram in accordance with principles of the disclosure.

FIG. 3 shows illustrative block diagram 300. Illustrative block diagram 300 may show packet analyzers monitoring packet flow over binary network 302 outside of enterprise firewalls.

The packet analyzer may be a piece of hardware or software also known as a protocol analyzer, a network analyzer, or a packet sniffer. The packet analyzer may look at packets sent through wired and wireless networks.

At step 1, Enterprise A 304 may transmit a message intended for Enterprise B 322. The message may include packets. The packets may transit through firewall 306 of Enterprise A 304.

At step 2, the packets may traverse on path 312 through binary network 302. Path 312 may be a copper wire. Path 312 may be an optical fiber. Path 312 may an electromagnetic wave.

At step 3, packet analyzer 308 may intercept the packets along path 312 as the packets leave firewall 306 of Enterprise A. Packet analyzer 308 may be operated by a malicious party to harm Enterprise A 304 or Enterprise B 322. Packet analyzer 308 may capture packets and write them, for example, to a local hard drive for analysis at the malicious party's convenience.

The packet analyzer may be a piece of hardware or software also known as a protocol analyzer, a network analyzer, or a packet sniffer. The packet analyzer may look at packets sent through wired and wireless networks.

At step 4, packet analyzer 326 may intercept the packets along path 312 as the packets approach firewall 324 of Enterprise B. Packet analyzer 326 may be operated by a malicious party to harm Enterprise A 304 or Enterprise B 322. Packet analyzer 326 may capture packets and write them, for example, to a local hard drive for analysis at the malicious party's convenience.

At step 5, the packets may traverse on path 312 through binary network 302.

At step 6, Enterprise B 322 may receive a message sent by Enterprise A 304. The message may include packets. The packets may transit through firewall 326 of Enterprise B 322.

Figure 4:
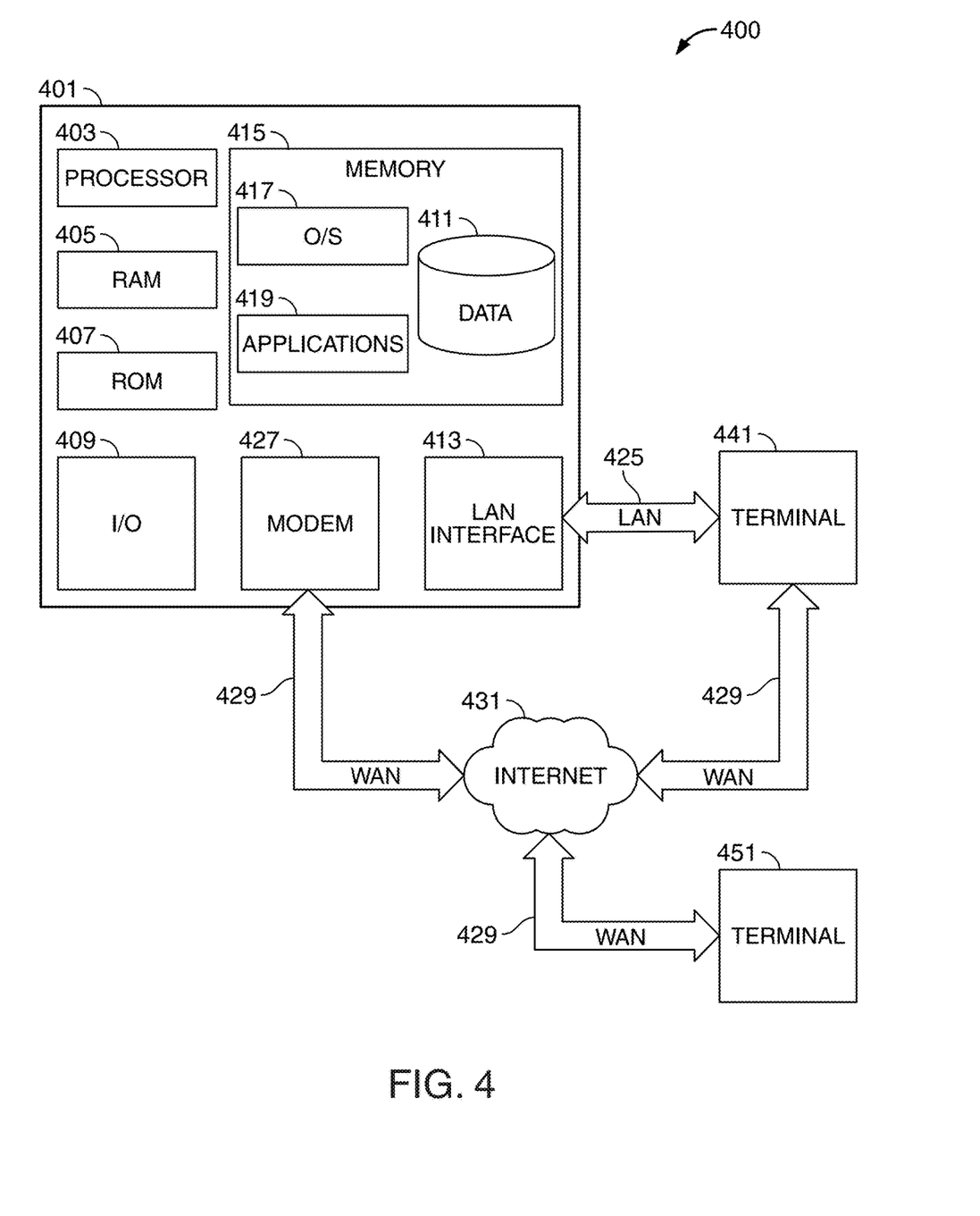
FIG. 4 shows an illustrative block diagram in accordance with principles of the disclosure.

In accordance with principles of the disclosure, FIG. 4 shows an illustrative block diagram of apparatus 400 that includes a computer or computer system 401. Apparatus 400 may include one or more features of the apparatus shown in FIGS. 1-5. Computer 401 may alternatively be referred to herein as a "computing device" or "computing system". Computer 401 may be a quantum computer or part of a quantum computer. Elements of apparatus 400, including computer 401, may be used to implement various aspects of the apparatus and methods disclosed herein. A "user" of apparatus 400 or computer 401 may include other computer systems or servers or computing devices, such as the program described herein.

Computer 401 may have one or more "N"-qubit processors as well as standard microprocessors 403 for controlling the operation of the device and its associated components, and may include RAM 405, ROM 407, input/output module 409, and a memory 415. The processors 403 may also execute all software running on the computer 401—e.g., the operating system 417 and applications 419. The processors 403 may establish quantum entanglement between qubits such as qubits in different locations. The processors 403 may run QEC. QEC may maintain coherence between entangled qubits. The processors 403 may establish correlation between qubits in different locations. Other components commonly used for computers, such as EEPROM or Flash memory or any other suitable components, may also be part of the computer 401.

The memory 415 may be comprised of any suitable permanent storage technology—e.g., a hard drive or other non-transitory memory. The ROM 407 and RAM 405 may be included as all or part of memory 415. The memory 415 may store software including the operating system 417 and application(s) 419 along with any other data 411 (e.g., historical data, configuration files) needed for the operation of the apparatus 400. Memory 415 may also store applications and data. Alternatively, some or all of computer executable instructions (alternatively referred to as "code") may be embodied in hardware or firmware (not shown). The microprocessor 403 may execute the instructions embodied by the software and code to perform various functions.

Memory 415 may store data as quantum states. Data may be transferred between qubits through quantum entanglement. Data may be stored on qubits as quantum states that are correlated to quantum states on other qubits. Data may be transferred between qubits through quantum entanglement.

The network connections/communication link may include a local area network (LAN) and a wide area network (WAN or the Internet) and may also include other types of networks. When used in a WAN networking environment, the apparatus may include a modem or other means for establishing communications over the WAN or LAN. The modem and/or a LAN interface may connect to a network via an antenna. The antenna may be configured to operate over Bluetooth, wi-fi, cellular networks, or other suitable frequencies.

Any memory may be comprised of any suitable permanent storage technology—e.g., a hard drive or other non-transitory memory. The memory may store software including an operating system and any application(s) along with any data needed for the operation of the apparatus. The data may also be stored in cache memory, or any other suitable memory.

An input/output ("I/O") module 409 may include connectivity to a button and a display. The input/output module may also include one or more speakers for providing audio output and a video display device, such as an LED screen and/or touchscreen, for providing textual, audio, audiovisual, and/or graphical output.

In an embodiment of the computer 401, the processor or processors 403 may execute the instructions in all or some of the operating system 417, any applications 419 in the memory 415, any other code necessary to perform the functions in this disclosure, and any other code embodied in hardware or firmware (not shown).

In an embodiment, apparatus 400 may consist of multiple computers 401, along with other devices. A computer 401 may be a mobile computing device such as a smartphone or tablet.

Apparatus 400 may be connected to other systems, computers, servers, devices, and/or the Internet 431 via a local area network (LAN) interface 413.

Apparatus 400 may operate in a networked environment supporting connections to one or more remote computers and servers, such as terminals 441 and 451, including, in general, the Internet and "cloud". These remote computers and servers, terminals 441 and 451 (as well as other terminals, not shown) may be other quantum computers. Quantum computers may interact with each other over a quantum network. Quantum computers may interact with each other through quantum entanglement. References to the "cloud" in this disclosure may refer to the Internet, which is a worldwide network. "Cloud-based applications" may refer to applications located on a server remote from a user, wherein some or all the application data, logic, and instructions are located on the Internet and are not located on a user's local device. Cloud-based applications may be accessed via any type of internet connection (e.g., cellular or wi-fi).

Terminals 441 and 451 may be other quantum computers or servers that include many or all the elements described above relative to apparatus 400. The network connections depicted in FIG. 4 include a local area network (LAN) 425 and a wide area network (WAN) 429 but may also include other networks. Computer 401 may include a network interface controller (not shown), which may include a modem 427 and LAN interface or adapter 413, as well as other components and adapters (not shown). When used in a LAN networking environment, computer 401 is connected to LAN 425 through a LAN interface or adapter 413. When used in a WAN networking environment, computer 401 may include a modem 427 or other means for establishing communications over WAN 429, such as Internet 431. The modem 427 and/or LAN interface 413 may connect to a network via an antenna (not shown). The antenna may be configured to operate over Bluetooth, wi-fi, cellular networks, or other suitable frequencies.

It will be appreciated that the network connections shown are illustrative and other means of establishing a communications link between computers may be used. The existence of various well-known protocols such as TCP/IP, Ethernet, FTP, HTTP, and the like is presumed, and the system can be operated in a client-server configuration. The computer may transmit data to any other suitable computer system. The computer may also send computer-readable instructions, together with the data, to any suitable computer system. The computer-readable instructions may be to store the data in cache memory, the hard drive, secondary memory, or any other suitable memory.

Application program(s) 419 (which may be alternatively referred to herein as "plugins," "applications," or "apps") may include computer executable instructions for a quantum authentication program and security protocols, as well as other programs. In an embodiment, one or more programs, or aspects of a program, may use one or more quantum authentication and AI/ML algorithm(s). The various tasks may be related to authenticating a user with a quantum computer.

Computer 401 may also include various other components, such as a battery (not shown), speaker (not shown), a network interface controller (not shown), and/or antennas (not shown).

Any information described above in connection with data 411, and any other suitable information, may be stored in memory 415. One or more of applications 419 may include one or more algorithms that may be used to implement features of the disclosure, and/or any other suitable tasks.

In various embodiments, the invention may be operational with numerous other general purpose or special purpose computing system environments or configurations. Examples of well-known computing systems, environments, and/or configurations that may be suitable for use with the invention in certain embodiments include, but are not limited to, personal computers, servers, multiprocessor systems, microprocessor-based systems, set top boxes, programmable consumer electronics, network PCs, minicomputers, mainframe computers, distributed computing environments that include any of the above systems or devices, quantum computers and the like.

Aspects of the invention may be described in the general context of computer-executable instructions, such as program modules, being executed by a computer. Program modules may include routines, programs, objects, components, data structures, etc., that perform tasks or implement abstract data types. The invention may also be practiced in distributed computing environments where tasks are performed by remote processing devices that are linked through a communications network, e.g., cloud-based applications. In a distributed computing environment, program modules may be in both local and remote computer storage media including memory storage devices.

Figure 5:
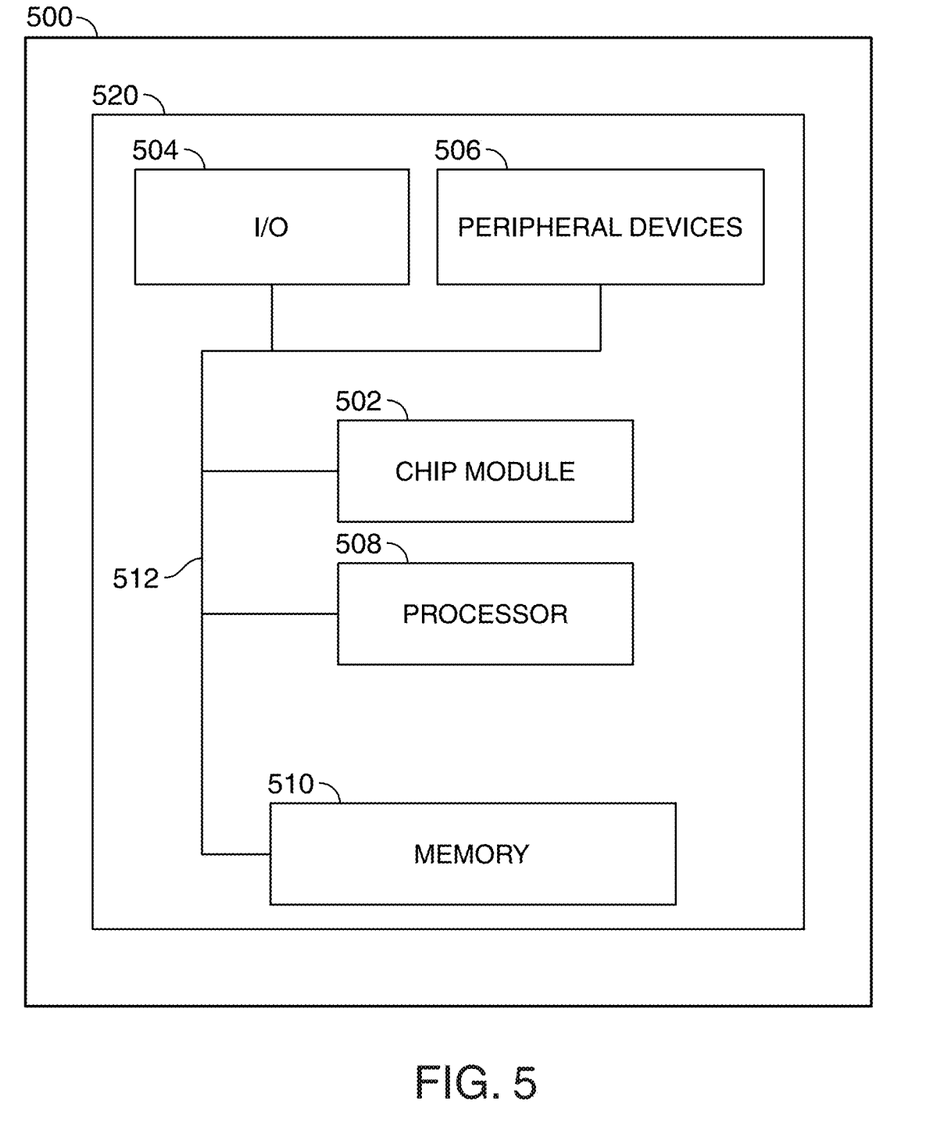
FIG. 5 shows an illustrative block diagram in accordance with principles of the disclosure.

FIG. 5 shows illustrative apparatus 500 that may be configured in accordance with the principles of the disclosure. Apparatus 500 may be a quantum computer, a server, or computer with various peripheral devices 506. Apparatus 500 may include one or more features of the apparatus shown in FIGS. 1-5. Apparatus 500 may include chip module 502, which may include one or more quantum and integrated circuits, and which may include logic configured to perform any other suitable logical operations.

Apparatus 500 may include one or more of the following components: I/O circuitry 504, which may include a transmitter device and a receiver device and may interface with fiber optic cable, coaxial cable, telephone lines, wireless devices, PHY layer hardware, a keypad/display control device, a display (LCD, LED, OLED, etc.), a touchscreen or any other suitable media or devices, peripheral devices 506, which may include other computers, logical processing device 508, which may be quantum based and may compute data information and structural parameters of various applications, and machine-readable memory 510.

Machine-readable memory 510 may be configured to store in machine-readable data structures: machine executable instructions (which may be alternatively referred to herein as "computer instructions" or "computer code"), applications, signals, recorded data, and/or any other suitable information or data structures. The instructions and data may be encrypted.

Components 502, 504, 506, 508 and 510 may be coupled together by a system bus or other interconnections 512 and may be present on one or more circuit boards such as 520. In some embodiments, the components may be integrated into a single chip. The chip may be silicon-based. The chip may be quantum-based.

Thus, provided may be systems and methods relating to secure data transfer and storage to meet a compliance requirement using quantum computing over a quantum network. Persons skilled in the art will appreciate that the present invention can be practiced by other than the described embodiments, which are presented for purposes of illustration rather than of limitation. The present invention is limited only by the claims that follow.

What is claimed is:

1. A system for secure data transfer and storage to meet a compliance requirement using quantum computing over a quantum network, the system comprising:
   a quantum computer;
   a data set;
   one or more quantum bits ("qubits") in a first set of qubits; and
   one or more qubits in a second set of qubits;
   the quantum computer is configured to:
      establish, over the quantum network, quantum entanglement between the one or more qubits in the first set of qubits and the one or more qubits in the second set of qubits by establishing coherence between the one or more qubits in the first set of qubits and the one or more qubits in the second set of qubits;
      store the data set on the one or more qubits in the first set of qubits, said data set stored as quantum states on the one or more qubits in the first set of qubits, and said first set of qubits is situated in a first location;

concurrent to storage of the data set on the one or more qubits in the first set of qubits, run a quantum algorithm that uses quantum entanglement between the one or more qubits in the first set of qubits and the one or more qubits in the second set of qubits to teleport the data set as quantum states of the one or more qubits in first set of qubits to the one or more qubits in the second set of qubits so that quantum states of the second set of qubits are correlated to quantum states of the first set of qubits, said second set of qubits situated in a second location; and applying quantum error correction ("QEC") to maintain quantum states of the one or more qubits in the second set of qubits for a predetermined time to meet the compliance requirement before the quantum states of the one or more qubits in the second set of qubits is lost through decoherence;

wherein:

the first location and second location are such that if the data set is transmitted from the first location to the second location over a binary network, the data set would pass through a router, a switch, or a firewall;

the first location and second location are such that the quantum states of the one or more qubits storing the data set are teleported from the first location to the second location over the quantum network without passing through a router, a switch, or a firewall; and energy expended to transfer the data set over the quantum network as quantum states of the one or more qubits in the first set of qubits in the first location and quantum states of the one or more qubits in the second set of qubits in the second location is less than energy expended to transfer the data set the first location to the second location over a binary network using a binary computer.

2. The system of claim 1 wherein applying QEC keeps the quantum states of the one or more qubits in the second set of qubits for a longer time than if QEC was not applied.

3. The system of claim 1 further comprising:

the quantum computer is configured to apply QEC to maintain quantum states of the one or more qubits in the first set of qubits for a predetermined time to meet the compliance requirement before the quantum states of the one or more qubits in the second set of qubits is lost through decoherence;

wherein applying QEC keeps the quantum states of the one or more qubits in the first set of qubits for a longer time than if QEC was not applied.

4. The system of claim 1 further comprising:

the quantum computer is configured to tag quantum states of the one or more qubits in the first set of qubits with a first tag and quantum states of the one or more qubits in the second set of qubits with a second tag;

wherein:

the first tag is used to identify the first location; and
the second tag is used to identify the second location.

5. The system of claim 4 wherein:

the first tag is stored on the first set of qubits; and
the second tag is stored on the second set of qubits.

6. The system of claim 1 wherein:

the data set is stored on the one or more qubits in the first set of qubits, or on the one or more qubits in the first set of qubits and one or more qubits in the second set of qubits to meet the compliance requirement; and the compliance requirement is a regulatory requirement, a governmental requirement, or a regulatory requirement and a governmental requirement.

7. The system of claim 1 wherein:

the data set is stored on the one or more qubits in the first set of qubits, or on the one or more qubits in the first set of qubits and one or more qubits in the second set of qubits for the predetermined time to meet the compliance requirement; and the compliance requirement is a regulatory requirement, a governmental requirement, or a regulatory requirement and a governmental requirement.

8. The system of claim 1 wherein using quantum entanglement to teleport the data set from the first location to the second location over a quantum network is less likely to be analyzed by a packet analyzer than when the data set is transmitted from the first location to the second location over a binary network and passes through a router, a switch, or a firewall.

9. A method for secure data transfer and storage to meet a compliance requirement using quantum computing over a quantum network, the method comprising:

establishing, using a quantum computer, quantum entanglement between one or more quantum bits ("qubits") in a first set of qubits and one or more qubits in a second set of qubits by establishing coherence between the one or more qubits in the first set of qubits and the one or more qubits in the second set of qubits;

storing, using a quantum computer, a data set on the one or more qubits in the first set of qubits, said data set stored as quantum states on the one or more qubits in the first set of qubits, and said first set of qubits is situated in a first location;

concurrent to storage of the data set on the one or more qubits in the first set of qubits, running, using the quantum computer, a quantum algorithm that uses quantum entanglement between the one or more qubits in the first set of qubits and the one or more qubits in the second set of qubits to teleport the data set as quantum states of the one or more qubits in first set of qubits to the one or more qubits in the second set of qubits so that quantum states of the second set of qubits are correlated to quantum states of the first set of qubits, said second set of qubits situated in a second location; and applying, using the quantum computer, quantum error correction ("QEC") to maintain quantum states of the one or more qubits in the second set of qubits for a predetermined time to meet the compliance requirement before the quantum states of the one or more qubits in the second set of qubits is lost through decoherence;

wherein:

the first location and second location are such that if the data set is transmitted from the first location to the second location over a binary network, the data set would pass through a router, a switch, or a firewall;

the first location and second location are such that the quantum states of the one or more qubits storing the data set are teleported from the first location to the second location over the quantum network without passing through a router, a switch, or a firewall; and energy expended to transfer the data set over the quantum network as quantum states of the one or more qubits in the first set of qubits in the first location and quantum states of the one or more qubits in the second set of qubits in the second location is less than energy expended to transfer the data set the first location to the second location over a binary network using a binary computer.

10. The method of claim 9 wherein applying QEC keeps the quantum states of the one or more qubits in the second set of qubits for a longer time than if QEC was not applied.

11. The method of claim 9 further comprising:
the quantum computer is configured to apply QEC to maintain quantum states of the one or more qubits in the first set of qubits for a predetermined time to meet the compliance requirement before the quantum states of the one or more qubits in the second set of qubits is lost through decoherence;
wherein applying QEC keeps the quantum states of the one or more qubits in the first set of qubits for a longer time than if QEC was not applied.

12. The method of claim 9 further comprising:
tagging, using the quantum computer, quantum states of the one or more qubits in the first set of qubits with a first tag and quantum states of the one or more qubits in the second set of qubits with a second tag;
wherein:
the first tag is used to identify the first location; and
the second tag is used to identify the second location.

13. The method of claim 12 wherein:
the first tag is stored on the first set of qubits; and
the second tag is stored on the second set of qubits.

14. The method of claim 9 wherein:
the data set is stored on the one or more qubits in the first set of qubits, or on the one or more qubits in the first set of qubits and one or more qubits in the second set of qubits to meet the compliance requirement; and
the compliance requirement is a regulatory requirement, a governmental requirement, or a regulatory requirement and a governmental requirement.

15. The method of claim 9 wherein:
the data set is stored on the one or more qubits in the first set of qubits, or on the one or more qubits in the first set of qubits and one or more qubits in the second set of qubits for the predetermined time to meet the compliance requirement; and
the compliance requirement is a regulatory requirement, a governmental requirement, or a regulatory requirement and a governmental requirement.

16. The method of claim 9 wherein using quantum entanglement to teleport the data set from the first location to the second location over a quantum network is less likely to be analyzed by a packet analyzer than when the data set is transmitted from the first location to the second location over a binary network and passes through a router, a switch, or a firewall.

17. A method for secure data transfer and storage to meet a compliance requirement using quantum computing over a quantum network, the method comprising:
establishing, using a quantum computer, quantum entanglement between one or more quantum bits ("qubits") in a first set of qubits and one or more qubits in a second set of qubits by establishing coherence between the one or more qubits in the first set of qubits and the one or more qubits in the second set of qubits;
storing, using a quantum computer, a data set on the one or more qubits in the first set of qubits, said data set stored as quantum states on the one or more qubits in the first set of qubits, and said first set of qubits is situated in a first location;
concurrent to storage of the data set on the one or more qubits in the first set of qubits, running, using the quantum computer, a quantum algorithm that uses quantum entanglement between the one or more qubits in the first set of qubits and the one or more qubits in the second set of qubits to teleport the data set as quantum states of the one or more qubits in first set of qubits to the one or more qubits in the second set of qubits so that quantum states of the second set of qubits are correlated to quantum states of the first set of qubits, said second set of qubits situated in a second location; and
applying, using the quantum computer, quantum error correction ("QEC") to maintain quantum states of the one or more qubits in the first set of qubits for a predetermined time to meet the compliance requirement before the quantum states of the one or more qubits in the second set of qubits is lost through decoherence;
tagging, using the quantum computer, quantum states of the one or more qubits in the first set of qubits with a first tag and quantum states of the one or more qubits in the second set of qubits with a second tag;
wherein:
applying QEC keeps the quantum states of the one or more qubits in the first set of qubits for a longer time than if QEC was not applied;
the first location and second location are such that if the data set is transmitted from the first location to the second location over a binary network, the data set would pass through a router, a switch, or a firewall;
the first location and second location are such that the quantum states of the one or more qubits storing the data set are teleported from the first location to the second location over the quantum network without passing through a router, a switch, or a firewall;
energy expended to transfer the data set over the quantum network as quantum states of the one or more qubits in the first set of qubits in the first location and quantum states of the one or more qubits in the second set of qubits in the second location is less than energy expended to transfer the data set the first location to the second location over a binary network using a binary computer;
the first tag is used to identify the first location;
the first tag is stored on the first set of qubits;
the second tag is used to identify the second location;
the second tag is stored on the second set of qubits; and
using quantum entanglement to teleport the data set from the first location to the second location over a quantum network is less likely to be analyzed by a packet analyzer than when the data set is transmitted from the first location to the second location over a binary network and passes through a router, a switch, or a firewall.

18. The method of claim 17 further comprising:
the quantum computer is configured to apply QEC to maintain quantum states of the one or more qubits in the second set of qubits for a predetermined time to meet the compliance requirement before the quantum states of the one or more qubits in the second set of qubits is lost through decoherence;
wherein applying QEC keeps the quantum states of the one or more qubits in the second set of qubits for a longer time than if QEC was not applied.

19. The method of claim 17 wherein:
the data set is stored on the one or more qubits in the first set of qubits, on the one or more qubits in the second set of qubits, or on the one or more qubits in the first set of qubits and the one or more qubits in the second set of qubits to meet the compliance requirement; and the compliance requirement is a regulatory requirement, a governmental requirement, or a regulatory requirement and a governmental requirement.

20. The method of claim 17 wherein:

the data set is stored on the one or more qubits in the first set of qubits, on the one or more qubits in the second set of qubits, or on the one or more qubits in the first set of qubits and one or more qubits in the second set of qubits for the predetermined time to meet the compliance requirement; and the compliance requirement is a regulatory requirement, a governmental requirement, or a regulatory requirement and a governmental requirement.

* * * * *